United States Patent [19]
Richardson et al.

[11] Patent Number: 5,326,579
[45] Date of Patent: Jul. 5, 1994

[54] PROCESS TO REMOVE CHOLESTEROL FROM DAIRY PRODUCTS

[75] Inventors: Thomas Richardson, Davis, Calif.; Rafael Jimenez-Flores, Champaign, Ill.

[73] Assignee: The Regents of the University of California, Oakland, Calif.

[21] Appl. No.: 906,108

[22] Filed: Jul. 6, 1992

Related U.S. Application Data

[63] Continuation of Ser. No. 598,356, Oct. 15, 1990, abandoned, which is a continuation-in-part of Ser. No. 421,153, Oct. 13, 1989, abandoned.

[51] Int. Cl.$^5$ .............................................. A23C 7/00
[52] U.S. Cl. .................................. 426/417; 426/422; 426/423; 426/478; 426/491; 426/495
[58] Field of Search ............... 426/417, 422, 423, 478, 426/490, 491, 495, 424

[56] References Cited

U.S. PATENT DOCUMENTS

| | | | |
|---|---|---|---|
| 3,450,541 | 6/1969 | Schwartz | 99/118 |
| 4,242,502 | 12/1980 | Malinow et al. | 536/5 |
| 4,489,067 | 12/1984 | Uenobe et al. | 424/195 |
| 4,524,067 | 6/1985 | Arichi et al. | 514/33 |
| 4,576,097 | 10/1985 | Pitha | 514/26 |
| 4,880,573 | 11/1989 | Courregeliongue et al. | 200/420 |

FOREIGN PATENT DOCUMENTS

| | | | |
|---|---|---|---|
| 318326 | 5/1989 | European Pat. Off. | 426/422 |

OTHER PUBLICATIONS

K. R. Price, et al., "The Chemistry and Biological Significance of Saponins in Food and Feedingstuffs," CRC Critical Reviews in Food Science and Nutrition, vol. 26, Issue I (1987), pp. 27–135.
Courchaine et al. (1959); Zlatkis et al. (1953), "Total and Free Cholesterol Techniques in Lipidology General Analytical Procedures, Techniques of Lipidology," pp. 360–361.
W. W. Christie, Composition and Structure of Milk Lipids, pp. 4–5.
I. Katz, et al. (1968), "Rapid Method for Isolation of Unesterified Sterols and Its Application to Detection of Milk Fat Adulteration with Vegetable Oils," J. Dairy Science, vol. 50, No. 11, 1764–1768.
"Fats (Animal in Vegetable Fats and Oils (Determination of Cholesterol) Gas Chromatographic Method Final Action," AOAC Official Methods of Analysis (1984), pp. 522–523.
W. J. Hurst, et al. (1984), "HPLC Determination of the Cholesterol Content of Egg Noodles as an Indicator of Egg Solids," J. Agric. Food Chem., vol. 33, pp. 820–822.
"Fats (Vegetable) in Butterfat Sterol Acetate Melting Point Method Final Action, AOAC Official Methods of Analysis" (1984) pp. 520–521.
"Flavoring Agents and Related Substances," CRC Handbook of Food Additives, Appendix 3, pp. 333–334.

*Primary Examiner*—Donald E. Czaja
*Assistant Examiner*—Anthony J. Weier
*Attorney, Agent, or Firm*—Phillips Moore Lempio & Finley

[57] ABSTRACT

The present invention relates to a process for the removal of cholesterol from a processed or un processed dairy product, which process comprises: (a) obtaining a processed or unprocessed dairy product containing cholesterol (b) contacting the dairy product at a temperature of between about 35° and 80° C. with an amount of saponin effective to bind up to about 90% of the cholesterol present in the dairy product; (c) contacting a temperature of between about 35° and 80° C. the cholesterol:saponin with an effective amount of diatomaceous earth; (d) separating the insoluble cholesterol:saponin/diatomaceous earth by filtration or centrifugation; and (e) recovering the dairy product having a reduced content of cholesterol. The process particularly useful wherein the dairy product is selected form raw milk, pasteurized milk, raw cream, pasteurized cream, butteroil or anhydrous fat. The dairy product having a lowered cholesterol level is useful as a food to restrict cholesterol intake in a human being.

19 Claims, 6 Drawing Sheets

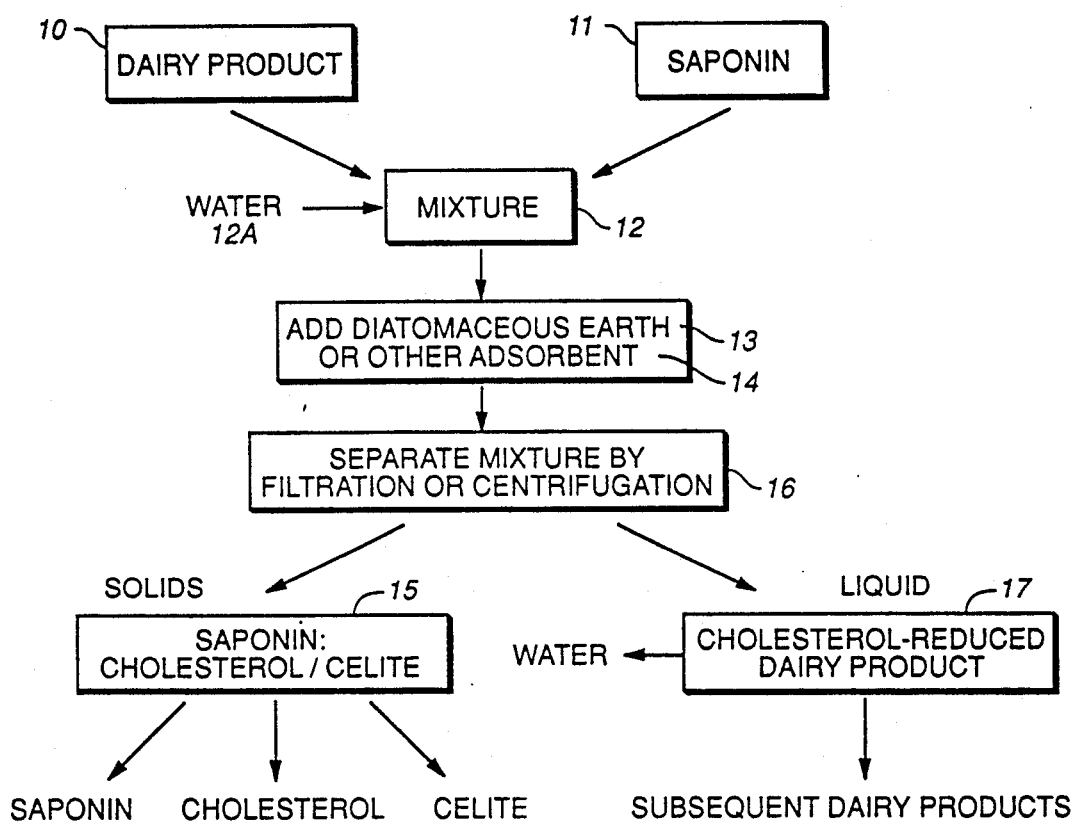
FIG._1

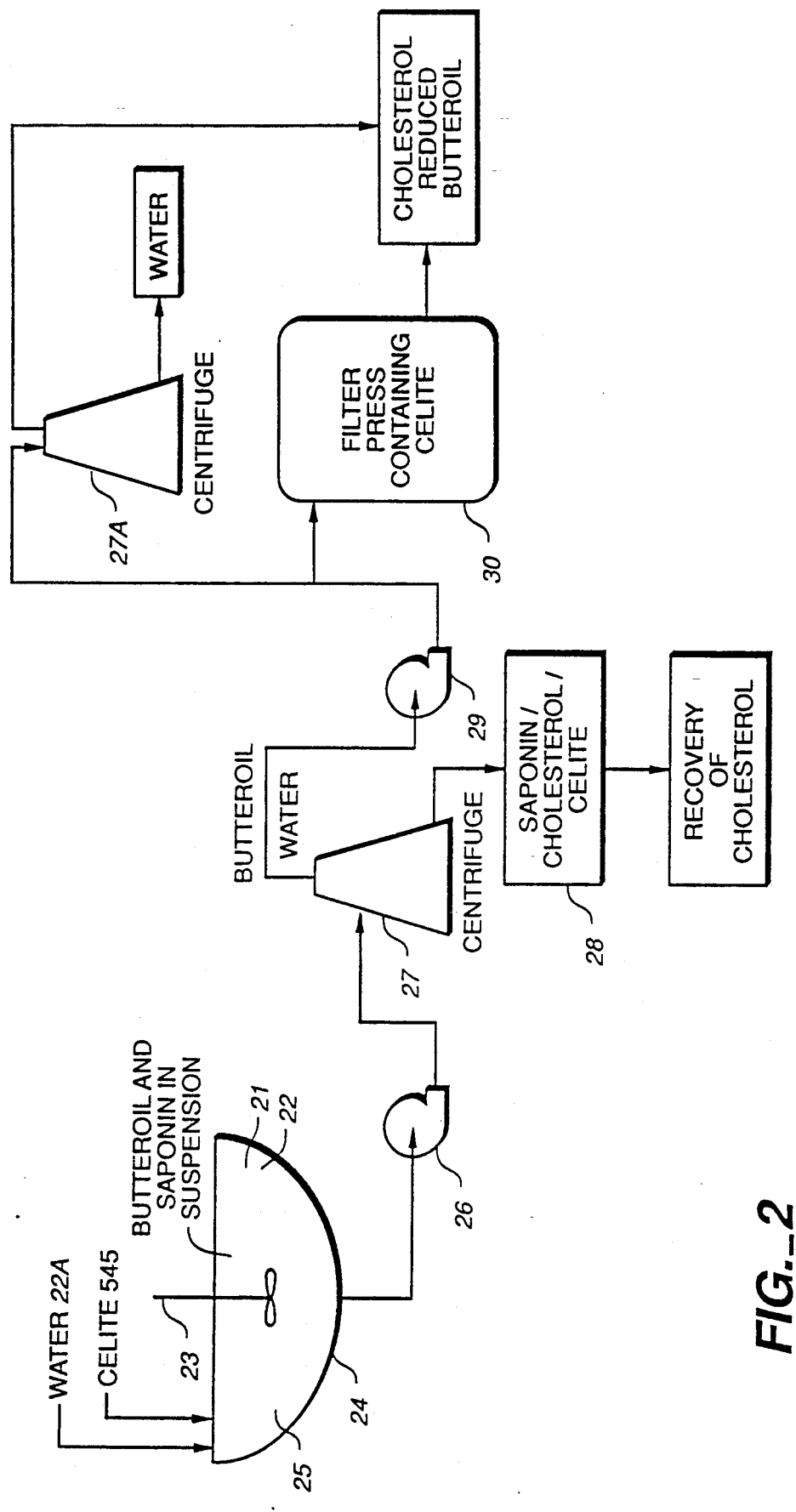
FIG._2

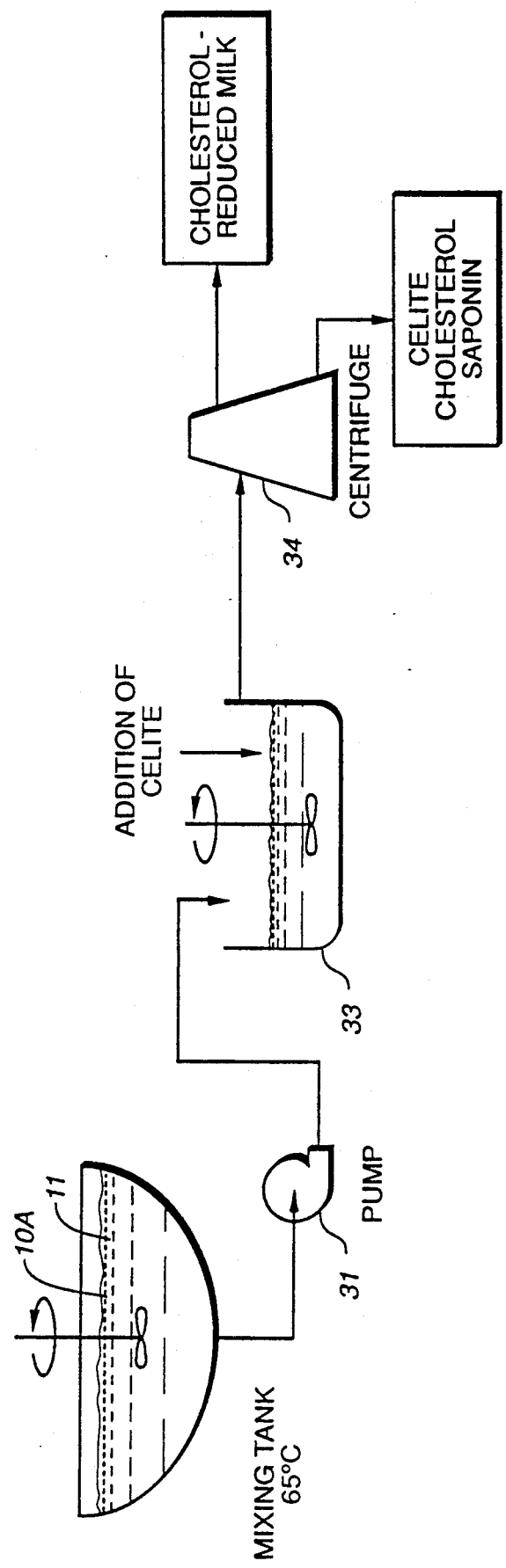
FIG._3

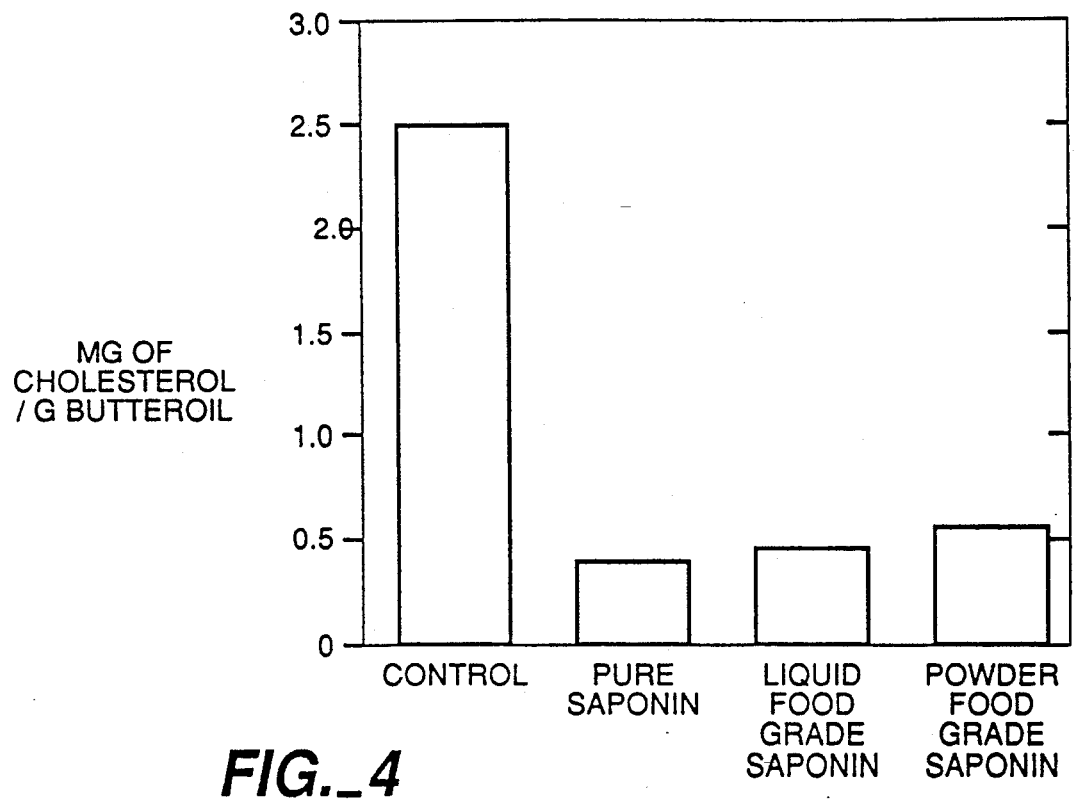
FIG._4
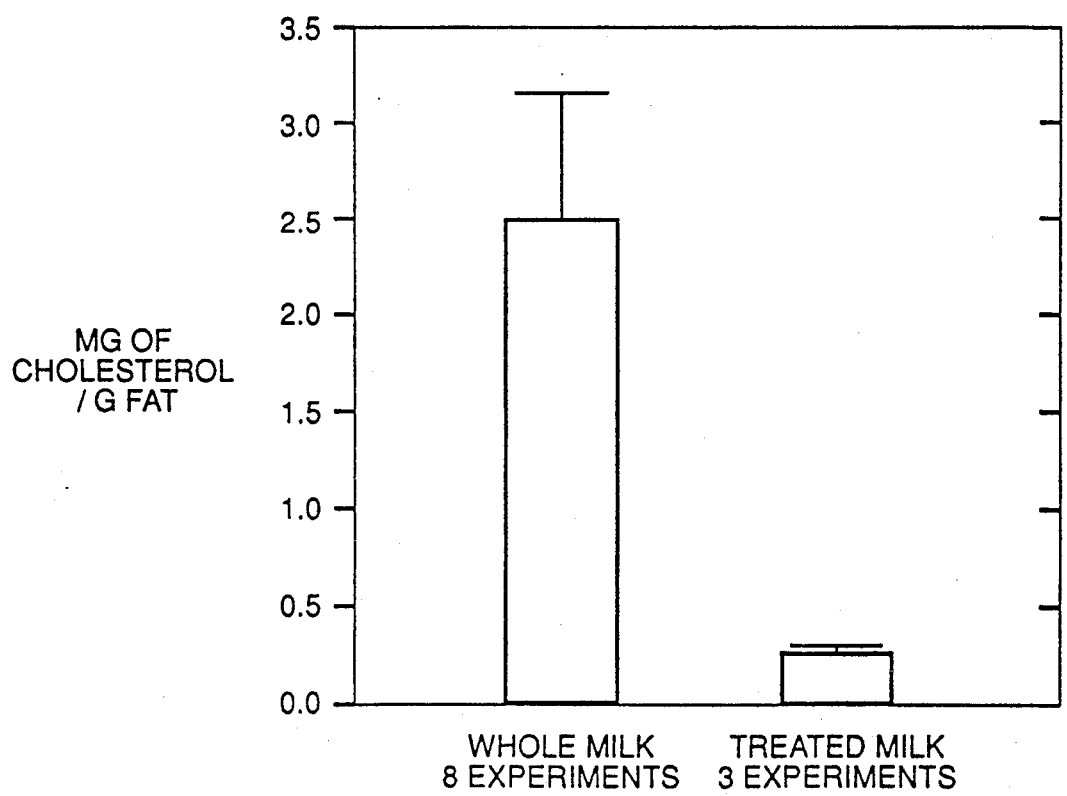
FIG._5

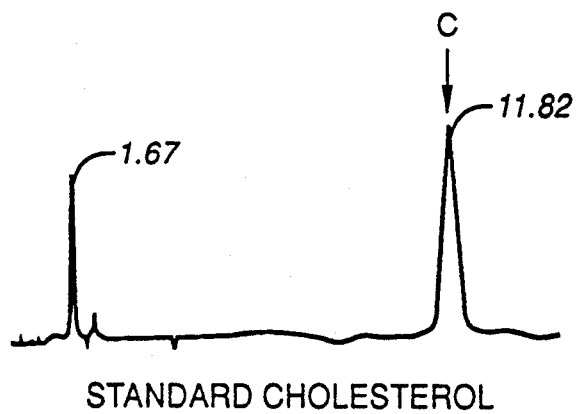
FIG._6A STANDARD CHOLESTEROL
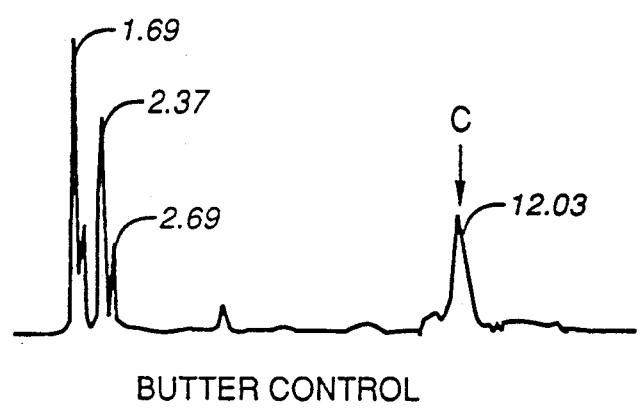
FIG._6B BUTTER CONTROL
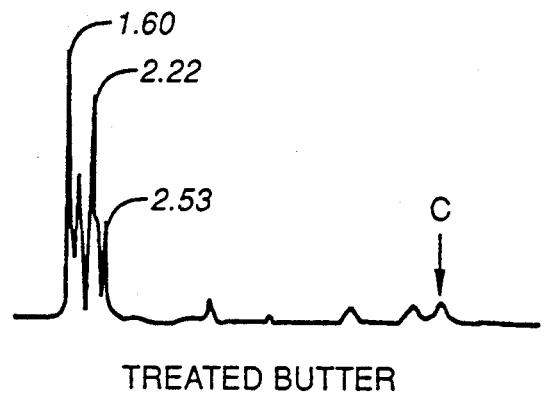
FIG._6C TREATED BUTTER

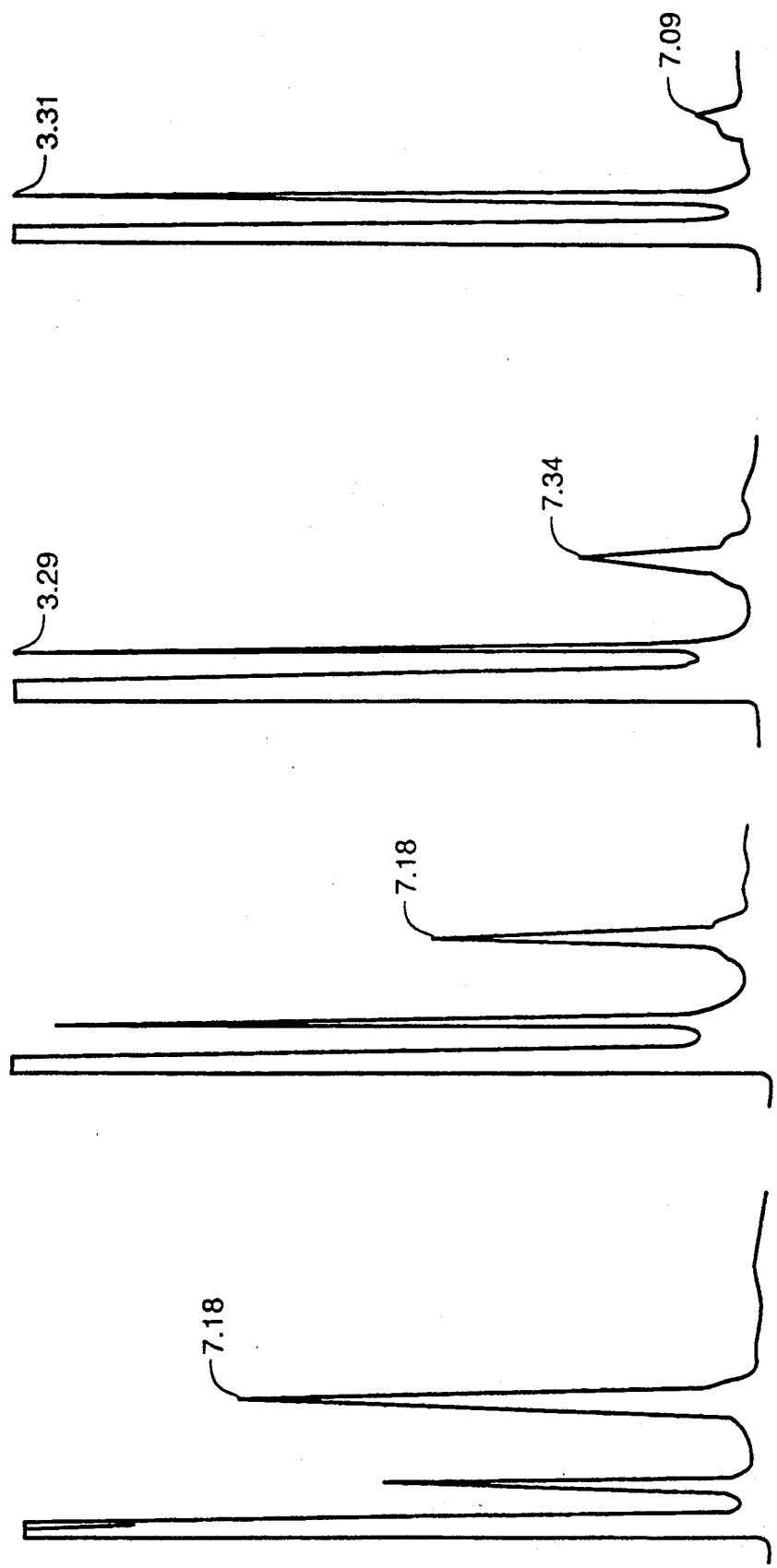
FIG._7A  FIG._7B  FIG._7C  FIG._7D

PROCESS TO REMOVE CHOLESTEROL FROM DAIRY PRODUCTS

ORIGIN OF THE INVENTION

This application is a continuation-in-part of application of U.S. patent application Ser. No. 421,153 filed Oct. 13, 1989, which is incorporated by reference in its entirety.

This is a continuation of copending application Ser. No. 598,356, filed on Oct. 15, 1990, which is a continuation-in-part of application Ser. No. 421,153, filed on Oct. 13, 1989, both now abandoned.

BACKGROUND OF THE INVENTION

1. Field of the Invention

The present invention relates to a process to remove cholesterol from dairy products. More specifically the present invention relates to a process of contacting a dairy product, such as milk, cream or butteroil, with saponin at an elevated temperature, followed by treatment with at least one diatomaceous earth or other adsorbent, and filtering to remove the insoluble cholesterol-saponin obtained.

2. Description of the Related Art

Cholesterol present in a variety of foods including meat and dairy products has long been implicated as a source of the high levels of cholesterol in humans. Milkfat, for example, usually contains about 310 milligrams total cholesterol per 100 grams (Christie, 1983). Further essentially all of the cholesterol in milk fat is present as free cholesterol with only traces of cholesterol present as an ester.

Therefore, it would be desirable to have an inexpensive large-scale process to remove cholesterol from dairy products ultimately used as foodstuffs.

Methods are known to remove cholesterol from dairy products. These include, for example, steam stripping, supercritical fluid extraction (SFE) using carbon dioxide, specific enzymatic cholesterol reductase or, adsorption using cyclodextrins. However, these other methods are lengthy, equipment intensive and/or expensive.

The following references are of general and specific interest:

AOAC Official Methods of Analysis, 14th Ed. "$\beta$-Sitosterol in butteroil." p. 522. Assoc. Off. Anal. Chem., Arlington, Va.

W. W. Christie, (1983). "The composition and structure of milk lipids. p.5 in *Developments in Dairy Chemistry*, Vol. II. Applied Science. New York, N.Y.

A. M. Glaurert, et al, (1962). "Action of saponin on biological cell membranes." *Nature* Vol. 194:953–955.

M. KATES, et al (1972). "Total and free cholesterol." in *Techniques of Lipidology*, P. 360. American Elsevier, New York, N.Y.

I. Katz, et al. (1967). "Rapid method for isolation of unesterified sterols and its application to detection of milkfat adulteration with vegetable oils." *J. Dairy Sci.*, Vol. 50:1764–1768.

K. R. Price, et al. (1987). "The chemistry and biological significance of saponins in foods and feeding stuffs." *CRC Critical Reviews in Food Science and nutrition.* Vol. 26:27–135.

D. P. Schwartz, et al. (1967). "Rapid quantitative procedure for removing cholesterol from butterfat." *J. Lipid Res.* Vol. 8:54–59.

P. Seeman, (1974). "Ultrastructure of membrane lesion in immune lysis, osmotic lysis and drug-induced lysis." *Federal Proceedings.* Vol. 33:2116–2120.

S. Takagi, et al. (1982). "Digitonin-cholesterol complex formation: effects of varying the length of the side chain. *Chem. Phar. Bull.* 30:3485–3491.

D. P. Schwartz, et al., U.S. Pat. No. 3,450,541.

J. Potha, U.S. Pat. No. 4,546,097.

T. E. Furia (ed) (1980) *CRC Handbook of Food Additives VII*, CRC Press, Boca Ratan, Fla.

W. J. Hurst, et al. (1985), "HPLC Determination of the Cholesterol Content of Egg Noodles as an Indicator of Egg Solids," *Journal of Agricultural Food Chemistry*, Vol. 33, pp. 820–822.

M. R. Malinow, et al., U.S. Pat. No. 4,242,502 issued Dec. 30, 1980, Class 536/5.

J. Courregelongue et al., U.S. Pat. No. 4,880,573, issued Nov. 14, 1989, Class 260/420.

S. Arichi et al., U.S. Pat. No. 4,524,067, issued Jun. 18 1985, Class 514/33.

F. Uenobe et al., U.S. Pat. No. 4,489,067 issued Dec. 10, 1984, Class 424/195.

European Patent application 318,326 issued May 1989.

All of the references, patents, standards, etc. cited in this application are incorporated by reference in their entirety.

Saponins are glycosides, occurring primarily but not exclusively, in plants that in general share a number of properties, including, binding of 3-$\beta$-OH sterols, marked foaming in water, surfactant properties and hemolysis of red blood cells when aqueous solutions are injected into the bloodstream. Saponins occur widely in plants used for food and feed and have a wide variety of structures which are reflected in their varying chemical and biological properties. In general, the aglycone or non-sugar portion of the molecule is a hydrophobic steroidal or triterpenoidal derivative whereas the polar carbohydrate moiety is comprised of different oligosaccharides of varying chain length, some being only mono- or di-saccharides. The sugars associated with the aglycone may include rhamnose, glucose, galactose, xylose, arabinose, glucuronic acid or mixtures thereof. Coupling of the oligosaccharide to the aglycone can involve hemiacetal linkages between the reducing end of a sugar residue or an ester linkage between the carboxyl group of the glucuronate both linked with a hydroxyl group of the aglycone.

The nature of the cholesterol-glycoside complex is apparently not known with certainty. Based on electron micrographs, Seeman (1974) and Glauret et al. (1962) proposed a micellar type arrangement where three saponin molecules associate via the carbohydrate residues projecting inward. The aglycone on the periphery complexes with cholesterol on an equimolar stoichiometry. More recently Takagi et al (1982) have proposed a structural model for the saponin-cholesterol complex based on studies of the interaction between digitonin and a series of cholesterol analogues. The data of Takagi et al. (1982) are not in agreement or compatible with the structure described by Seeman (1974) and Glauret et al. (1962). The data of Takagi et al. (1982) suggest that the digitonin-cholesterol complex is a clathrate in which digitonin molecules associate to form a hydrophobic pocket in which the cholesterol is a guest. Takagi et al. (1982) proved that the stoichiometry of the cholesterol:digitonin complex is 1:1

Many, but not all, saponins are fungistatic. Because they can hemolyze red blood cells, saponins are generally toxic when injected intravenously. However, the oral toxicity of many saponins is quite low because they are not absorbed from the gut. There is some evidence that saponins included in feeds at relatively high levels leads to reduced growth rates in poultry and monogastric mammals. Most common saponins of foods and feedstuffs seem to be free of significant oral toxicity. For example, soybean saponins fed at high concentrations to chicks, mice and rats had no adverse effects. Rats fed alfalfa saponins at a level of 1% in the diet for up to 6 months showed no ill effects, although a potentially beneficial reduction in serum cholesterol and triglycerides was observed. In monkeys (primates also known as *Macaca fascicularis*), no adverse effects were observed after the consumption of an undefined mixture of alfalfa top saponins for up to 18 months.

The triterpenoid saponins from a soap bark (also known as *Ouillaja saponaria*) are widely used in some countries as food additive (foaming and emulsifying agent) and have been subjected to thorough toxicological tests. No significant toxic effects were observed in short-term feeding studies in rats, nor in mice fed the material at levels as high as 1.5% over a prolonged period. Saponin-containing extracts of a yucca plant (*Yucca mohavensis*) were found to be less hemolytic than those of soybeans. No adverse effects of feeding commercial *Yucca mohavensis* saponin (0.05%) for 12 weeks were noted in rats in respect to growth, food utilization, blood counts, blood glucose and nonprotein N or in gross or histological findings post-mortem.

Retardation of growth by dietary saponins was first observed in chicks fed alfalfa. The effect could be overcome by the addition of 1% cholesterol in the diet; presumably by forming a complex with the saponins in the gut. Growth retardation by dietary saponins has been observed in other avian species and in other monogastric animals (particularly swine) and in laboratory mammals. Isolated saponins from a trefoil (also known as *Medicago lupulina*) and from other genera, such as Quillaja and Gypsophila species have also been shown to cause growth retardation in rodents. Primates appear to be more resistant to the detrimental biological effects of dietary saponins, and some researchers believe that primates may have adapted to saponins in the diet. It would appear that saponins in foods and feeds have a low order of oral toxicity.

A number of researchers have observed that different saponins exert a hypocholesterolemic effect when included in the diet of various animals at non-toxic levels. (See Price et al. (1987)). The effect appears to be more than binding of cholesterol in the gut to prevent its absorption. Evidence has been presented that saponins also increase the fecal excretion of bile acids. Since bile acids are derived from the body's cholesterol this decreases the body burden of cholesterol, thereby lowering serum cholesterol. The hypocholesterolemic effect of saponins has prompted some biomedical researchers to propose using foods containing them in serum cholesterol-lowering diets.

Saponins occur in a variety of common foods and feeds as well as herbs and tonics (Price et al., 1987). In Table 1 are listed some foods, herbs, flavorings, health foods, tonics and feeds containing substantial concentrations of saponins.

TABLE 1

Saponins (% where given) in selected foods, herbs, flavorings, health foods, tonics and feeds (See Price, et al., 1987 above).

| PLANT PRODUCT | Saponins, % |
|---|---|
| Foods | |
| Soybeans - full fat | 0.22–5.6 dry wt. |
| Protein isolates | 0.3–2.5 dry wt. |
| | 0.76 wet wt. |
| Defatted soy flour | 0.67 wet wt. |
| Fermented soy products | 0.25–0.84 dry wt. |
| Tofu | 0.30–2.1 dry wt. |
| Butter beans | 0.10 dry wt. |
| Kidney beans | 0.2–1.6 dry wt. |
| Navy beans | 0.4–2.1 dry wt. |
| Canned baked beans | 0.45 dry wt. |
| Green pea | 0.18–4.2 dry wt. |
| Peanuts | 0.001–1.6 dry wt. |
| Asparagus | 1.5 dry wt. |
| Garlic | 0.3 dry wt. |
| Alfalfa sprouts | 8.0–8.7 dry wt |
| Oats | 01–0.13 dry wt. |
| Sesame seeds | 0.30 dry wt. |
| Tomato seeds | 1.0 dry wt. |
| Onions | |
| Lentils | |
| Green pepper | |
| Tea | |
| Pumpkins | |
| Melons/Watermelons | |
| Yams | |
| Cucumber | |
| Blackberry | |
| Herbs, Flavorings, Health Foods, Tonics | |
| Aloe | |
| Lemongrass | |
| Sage | |
| Fenugreek | |
| Licorice | |
| Nutmeg | |
| *Quillaja* | |
| *Saponaria* | |
| *Yucca* | |
| *Gypsophila* | |
| Ginseng | |
| Feeds | |
| Alfalfa | 0.17–1.71 |
| Alfalfa meal | 1.26 |
| Horse chestnut | 3–6 |
| Lupins | 1.1–1.7 |
| Black medic trefoil | 3.5 |

It is apparent from Table 1 that saponins occur in a wide variety of plants, many of them consumed by humans. Also, common animal feeds contain substantial quantities of saponins. *Quillaja saponaria* (soapbark) which contains 10% saponins (Price et al., 1987) and *Yucca mohavenensis* (rich in saponins) are evidently approved in the U.S.A. for use as food additives with no apparent limitations (Furia, 1980). Crude extracts of these sources of saponins are commercially available and relatively low in price.

It is reported that an analytical procedure using benzene is described for the removal and determination of cholesterol in milk-fat using digitonin, which is a known regulated toxic cardiac stimulant for mammals, e.g. human beings. (See D. P. Schwartz et al. (1967)). The use of benzene solvent has its difficulties, and high cost and cannot be applied to foodstuffs.

It would therefore be very valuable to use the less expensive crude extracts of plant saponins (food grade) for the large scale removal of cholesterol from dairy products which can be used in food-stuffs. The present invention provides such a procedure.

SUMMARY OF THE INVENTION

The present invention relates to a process to remove cholesterol from a dairy product using one or a mixture of saponins. The process includes:

(a) obtaining a processed or unprocessed dairy product;

(b) treating the dairy product at a temperature of between about 35° and 80° C. with an amount of nontoxic saponin effective to bind up to about 90% or more of cholesterol present in the dairy product;

(c) treating, at a temperature between about 35° and 80° C., the cholesterol:saponin complex with an effective amount of a solid adsorbent;

(d) separating the insoluble solid cholesterol:saponin complex from the liquid by centrifugation or filtration; and (e) recovering the dairy product having a reduced content of cholesterol which can be ingested by other mammals.

In embodiments for milk or cream some water is naturally present. For butter or butteroil, in step (b) water (a 10 to 20 fold excess based on the total sample weight) is added, and in step (d) the solid complex is removed usually by centrifugation followed by separation of the butteroil and aqueous phases, usually by centrifugation.

In a preferred embodiment, the dairy product is butteroil having a cholesterol concentration of between about 0.02 to 0.1 g/ml contacted with saponin at between about 35° to 55° C., especially at about 40° C.

In another preferred embodiment, the dairy product is milk or cream treated with saponin at 56° to 75° C., especially about 65° C. to remove cholesterol.

In another embodiment, the present invention is the process wherein the dairy product is butteroil and the process of steps (b) to (e) is performed at between about 35° and 50° C.

Another embodiment concerns the process wherein:

in step (b) the saponin is present in about 20 fold excess of the cholesterol present and the time of contact is between about 5 and 16 hours;

in step (c) the temperature is between about 35° and 50° C. and the adsorbent is selected from CELITE, silica, alumina, aluminum oxide or bentonite; and in step (d) the insoluble cholesterol/saponin/adsorbent complex is removed by centrifugation.

Another embodiment concerns the process wherein in step (b) the saponin is prewashed with an organic solvent to remove some organic soluble materials and the saponin is obtained from Ouillaja or Yucca plants and is of ford grade quality, and in step (c) the absorbent is CELITE #535 diatomaceous earth.

Another embodiment concerns the process wherein in steps (b) and (c) is at about 40° C. and the adsorbent is CELITE #545, and in step (d) the insoluble complex is separated using vacuum filtration through CELITE 560 at between about 55° and 60° C.

Another embodiment concerns a process for the removal of cholesterol from a cholesterol containing product, which process comprises:

(a) obtaining a product containing cholesterol;

(b) treating the product at a temperature of between about 35° and 80° C. with an amount of saponin effective to bind the cholesterol present in the product;

(c) treating a temperature of between about 35° and 80° C. the cholesterol:saponin with an effective amount of diatomaceous earth or other adsorbent;

(d) separating the insoluble cholesterol: saponin/diatomaceous earth or other adsorbent by sedimentation, filtration, or centrifugation; and (e) recovering the product having about 90% of the cholesterol removed.

Another embodiment concerns the process wherein in step (b) the saponin is present in about 20 fold excess of the cholesterol present and the time of contact is between about 1 and 16 hours;

in step (c) the temperature is between about 35° and 50° C. and the adsorbent selected from CELITE, silica, alumina, aluminum oxide or bentonite; and in step (d) the insoluble cholesterol/saponin/adsorbent complex is removed by centrifugation.

Another embodiment concerns the process wherein in step (b) the saponin is prewashed with an organic solvent to remove some organic soluble materials and the saponin is obtained from Quillaja or Yucca plants and is of food grade quality, and in step (c) the diatomateous earth is CELIT #535.

Another embodiment concerns the process wherein the mixing in steps (b) and (c) is at about 40° C. and the adsorbent is CELITE #545, and in step (d) the insoluble reactants are separated using vacuum filtration through CELITE 560 at between about 55° and 60° C.

BRIEF DESCRIPTION OF THE FIGURES

FIG. 1 is a general schematic representation of the process to remove cholesterol.

FIG. 2 is a schematic representation of one embodiment to remove cholesterol from butteroil.

FIG. 3 is a schematic representation of one embodiment to remove cholesterol from whole milk.

FIG. 4 is a graph of the cholesterol level in a control sample and a treated butteroil based upon the use of liquid or solid saponin.

FIG. 5 is a composite graph of the removal of cholesterol from milk at 65° C. using the process of the present invention. Untreated whole milk initially shows the presence of about 2.5 mg of cholesterol per gram of fat (composite of 8 experiments). The saponin-treated milk has a level of about 0.25 mg cholesterol per gram of fat (3 exp.).

FIG. 6 is a series of HPLC chromatograms showing the removal of cholesterol from butteroil at 65° C. using saponins.

FIG. 6A is a high pressure liquid chromatogram of a standard control sample of cholesterol.

FIG. 6B is a high pressure liquid chromatogram of a butteroil control sample containing 2.5 mg cholesterol per gram of fat.

FIG. 6C is a high pressure liquid chromatogram treated butteroil showing 93.4% removal of the cholesterol (to 0.17 mg of cholesterol per gram of fat).

FIG. 7 is a series of HPLC chromatograms showing the removal of cholesterol from cream at 65° C. using different concentrations of saponin per gram of fat present.

FIG. 7A is a high pressure liquid chromatogram of a milk fat from control cream containing 3.7 mg cholesterol per gram of fat.

FIG. 7B is a gas liquid chromatogram of a cream treated with 0.04 g saponin per gram of fat showing 35% removal of cholesterol.

FIG. 7C is a high pressure liquid chromatogram of a cream treated with 0.1 g of saponin per gram of fat showing 65% removal of cholesterol.

FIG. 7D is a high pressure liquid chromatogram of a control sample of cream treated with 0.04 g of digitonin per gram of fat showing 92% removal of cholesterol.

DETAILED DESCRIPTION OF THE INVENTION AND PREFERRED EMBODIMENTS

Definitions

As used herein:

"Butteroil" refers to oil or anhydrous milkfat derived from milk or other dairy product.

"CELITE TM" is a trademark for diatomaceous earth and related products.

"Diatomaceous earth" refers to solid filter aids and adsorbents derived from diatoms and is a form of silicon oxide.

"Pasteurized cream" refers to cream which has undergone the usual pasteurization conditions of heating at 65° C. for 30 minutes.

"Pasteurized milk" refers to milk which has undergone the usual pasteurization conditions of heating at 71.6° C. for about 15 sec.

"Raw cream" refers to cream obtained from raw milk.

"Raw milk" refers to milk as obtained from the lactating mammal.

"Saponin" refers to glycosides occurring primarily, but not exclusively in plants which bind effectively with 3-$\beta$-OH sterols.

DESCRIPTION

It is an object of the present invention to provide an improved process for the removal of cholesterol from butteroil, dairy products and other cholesterol containing food, e.g. eggs, shrimp, etc. The human-food grade, food (e.g., dairy) product thus obtained has a very low cholesterol level or is essentially cholesterol-free In the present invention it has been found that when butteroil is first mixed with a quantity of food grade saponin, optionally first washed with a food grade petroleum ether or alkyl ether to remove lipid soluble material, that an insoluble cholesterol-saponin complex is formed which is essentially quantitative and the subsequent removal of the cholesterol present is about 80 or 90% or higher.

Optionally, a quantity of water 1 to 80 fold, preferably 5 to 30 fold is added to the food product prior to or during or after the addition of the food-grade saponin. The removal of the cholesterol from any additions appear to be generally equivalent.

Next, powdered adsorbent, such as diatomaceous earth, e.g., CELITE, is added and mixed.

The solid product is removed by conventional centrifugation or filtration in either a continuous or a batch manner. One conventional dairy centrifuge useful at a prepilot state model is available from Westfalia Separator A.G. of Oelde, West Germany or from its American counterpart, Centrico, Inc. located at 3400 Third Avenue, Foster City, Calif. 94404. Larger models for pilot plant and commercial scale separations are also available from Centrico, Inc.

If water is present, it is then removed by separation of the nonmiscible phases using a centrifuge or by filtration.

The human-food grade food (e.g., dairy) product containing butterfat now has about 80–90% or more of its cholesterol removed.

The process of the present invention is exemplified for the removal of cholesterol from a typical butterfat. This process is preferably used for removal of cholesterol from dairy products, but it is equally applicable for the separation of naturally occurring (3$\beta$-hydroxy) sterols from any lipid mixture, particularly those subsequently used for a food stuff. These other sterols include ergosterol and zymosterol from fungi, and stigmasterol, spinasterol and other phytosterols from plants.

It is to be understood that although dairy products are a primary focus of the present invention that any cholesterol-containing food may have its cholesterol level reduced according to the present invention. Egg (or egg yolk) can be pureed (liquid eggs) optionally dissolved in an organic solvent and/or water and treated with saponin/adsorbent (CELITE TM). The cholesterol can be separated and the cholesterol-lowered powdered eggs recovered by concentration.

Referring now to the figures, FIG. 1 shows a schematic representation of one embodiment of the cholesterol removal process. A dairy product 10 (or other cholesterol containing material, e.g. egg) is contacted, with food grade saponin 11 to produce a mixture 12 which is agitated for a time effective to complex the cholesterol:saponin. Preferably, water is added to the butteroil. About 1 to 80 times by weight is used, preferably between about 5 to 30 times the weight of the butteroil is used. Diatomaceous earth 13 (or other adsorbent) 14 is added and agitated. The insoluble cholesterol:saponin:absorbent complex 15 is separated by centrifugation or filtration 16. The complex 15 can be further separated for recycle or for sale. The liquid filtrate 17 has a reduced cholesterol content and can be converted into subsequent products, e.g. food grade dairy products. The liquid/solid is conveyed by pumps, pipes and the like which are standard equipment in this art.

FIG. 2 shows a schematic representation of the process to remove cholesterol from butteroil. The butteroil (about 300 g) 21 and saponin 22 (about 12 g) are suspended and agitated using agitator 23 in a container 24 at 40°–80° C. Water 22A (1–80 fold by weight preferably 5 to 30 fold by weight) is added at 40° C. Because butteroil is not a good medium for pathogens and/or bacteria to grow, thus this lower process temperature (40° C.) is possible. To the cholesterol, saponin is added an adsorbent 25, e.g. CELITE 545 in small quantities between about 0.024 and 0.24 g/g of fat preferably about 20.24 g/g fat. This mixture is agitated for 1 to 20 hr (preferably 12 hrs.) at 40° C. The butteroil cholesterol:saponin: CELITE is pumped 26 into a centrifuge 27 which operates at between about 100 and 10,000 g (preferably 1,000 g) at about 40° C. The insoluble saponin cholesterol:saponin:adsorbent 28 is removed. The liquid is pumped using pump 29 and filtered hot through a filter (e.g. CELITE) 30 to remove residual solids. The cholesterol reduced butteroil is recovered. Optionally, the butteroil/water is passed through centrifuge 27A which is adapted to separate liquids. The water is removed and the cholesterol reduced butteroil is recovered.

FIG. 3 is a schematic representation of a general process to remove cholesterol from whole milk (or cream). Whole milk 10A and saponin are combined in milk tank 11 at 65° C. container and agitated between about 0.5–2 hr. preferably about 1 hr. The product is pumped using pump 31. The product is then transferred in tank 33 where adsorbent, e.g. CELITE 545, is added to tank 33 to break any emulsion. Solid adsorbent:-cholesterol:saponin complex is separated using centrifuge as described above. The cholesterol reduced milk can be used directly or in food products.

FIG. 4 shows the removal of cholesterol from butteroil using different grades of saponin.

FIG. 5 shows the removal of cholesterol from milk. About 80% removal is observed.

Removal of Cholesterol from Butteroil or Milk Fat (a) The crude saponin (about 0.6 g) is obtained from Penco of Lyndhurst.

(b) The butteroil is mixed with the saponin solution 10 to 100 mg/ml (preferably 45 mg/ml) so that a final concentration of between 10 to 100 mg (preferably 40 mg) of saponin extract is present per gram of butteroil. This is approximately a 20 fold by weight of cholesterol in milk fat. An emulsion is formed that has the viscosity and appearance of mayonnaise at 20° C. or cold heavy whipped cream.

(c) The butteroil and aqueous solution are shaken in a standard waterbath shaker at between about 100 and 300 rpm (preferably at 200 rpm) at 35° to 75° C., preferably 40° C., for between about 1 to 24 hr, preferably between about 8 and 16 hr, most preferably about 12 hr.

(d) To the emulsion is added about 20 to 1000 mg, preferably 100 mg, of CELITE #535 per gram of butteroil. The reaction mixture was maintained with shaking at about 150 to 300 rpm, preferably about 200 rpm at about 35° to 75° C., preferably 40° C., for about 1–24 hr, preferably 2 hr.

(e) The emulsion is filtered through a CELITE 560 filter cake at about 40° to 75° C. preferably 50°–55° C., most preferably 52° C. The temperature is increased because of the higher viscosity of the butteroil at lower temperatures.

(f) The filtrate is allowed to separate at 40° C., preferably into two liquid phases, and the purified butteroil is collected.

(g) A small (0.1 g) portion of fat is removed to determine the level of cholesterol remaining in the butteroil using the high pressure liquid chromatography procedure of W. J. Hurst, et al. as described herein.

Removal of Cholesterol from Cream or Milk (a) The milk or cream is mixed with the food grade saponin extract (a dry powder is preferred) using about 10 to 100 mg (preferably 40 mg) of saponin per gram of fat in the milk or cream.

(b) The saponin-milk mixture is shaken (250 rpm) in a shaker waterbath at 56° to 75° C. (preferably 65° C.) for 1–24 hrs., preferably 2 hr.

(c) CELITE #545 (Manville Corp., Denver, Col.) is added to the shaker flask (100 mg of CELITE per gram of fat in the milk) and shaken at 250 rpm for 1 hr.

(d) The reaction mixture is filtered through a CELITE #560 filter cake (about ¼ inch thick) at 65° C. using a water vacuum.

(e) At this point, the filtered milk is collected, and cholesterol determined according to the HPLC procedure of W. J. Hurst et al. which is incorporated herein by reference.

In one embodiment, butteroil is treated according to all steps of the claimed process at between about 35° and 50° C., preferably about 40° C.

In another embodiment, raw milk, pasteurized milk, raw cream, and pasteurized cream are treated according to all steps of the claimed process at between about 56° and 75° C. It is also preferred that the milk not be homogenized.

In one embodiment, the saponin extract from Quillaja (40 mg) per gram of butterfat in milk are combined. This mixture is shaken at 200 rpm at 65° C.±0.1° C. for 2 hr. Next, the mixture is treated with 25 g of CELITE #560 at 65° C.±1° C. for 1 hr. with shaking at 200 rpm. The milk is then filtered hot 65° C. through a filter cake of CELITE 560. The milk thus treated has the level of cholesterol lowered to about 25% by weight of the cholesterol originally found in the milk.

The following Examples are presented to be descriptive and illustrative only. They are not to be construed as being limiting in any way.

Materials and Equipment

Gyrotary Waterbath Shaker, Model G76, New Brunswick Scientific, Edison, N.J.

Varian High Pressure Liquid chromatograph. Model 5020 2700 Mitchell Drive, Walnut Creek, Calif. 94598. Column ALTECH #28024 VERSAPACK C1810U—250 mm and under diameter of 4.1 mm. The eluent is 1% isopropanol/hexane which is stored under a nitrogen atmosphere.

The CELITE used in the present invention is available from the Manville Corp., Denver, Col., in a number of useful grades CELITE 560 and CELITE 545 are preferred in the present invention.

EXAMPLE 1

Removal of Cholesterol From Dairy Products (a) Ouillaka, 0.6 g (prewashed with 2×100 ml portions of diethylether) was added to each of six comparable samples (B to G) of milk and are as follows:
A. Control—No saponin
B. Homogenized milk, 37° C., plus 1 ml NaN$_3$
C. Non-homogenized milk, 37° C., plus 1 ml NaN$_3$
D. Homogenized,4° C.
E. Non-homogenized,4° C.
F. Cream, 37° C., 1 ml NaN$_3$
G. Cream,4° C.

(b) Samples A to G were agitated 4 hr using a shaker (250 rpm) at the temperatures cited.

(c) CELITE #545 (e.g., from Manville), (2 g) was added to each sample.

(d) Each sample was again agitated for one hour at their respective temperatures given above.

(e) Milk samples A, B, C, D, E, F and G were heated to 72° C. for 5 min.

(f) Each sample was then filtered through a CELITE #545 filter cake and collected in a 50 ml screw-top test tube.

(g) These treated dairy product samples were then analyzed for cholesterol according to Example 2.

EXAMPLE 2

Cholesterol Determination of Dairy Products (a) 0.1 Gram of treated butteroil from 9 ml of milk or cream were saponified for subsequent cholesterol analysis;

(b) Each sample was placed in a test tube with 5-ml of 2N methanoic KOH to saponify;

(c) The saponification was continued overnight 45-60 min in a 65° C. water bath.

(d) Each sample and tube was cooled to ambient temperature (about 20° C.).

(e) To each tube was added 5 ml of water and 1 ml of 10% sodium chloride solution.

(f) Each sample is then extracted with 2×10 ml of petroleum ether/diethyl ether (1/1:v/v). The aqueous phases were discarded.

(g) The two organic extracts were combined together and evaporated using a nitrogen stream coupled with gentle heating from a hot water bath.

(h) The residue was resuspended in 20 ml of petroleum ether.

(i) 10 ml of the organic phase is passed through a silica SEP-PAC C-18 Waters Associates, Medford, Mass., and the effluent is discarded.

(j) The SEP-PAC is washed with 10 ml of 7% ethyl ether-petroleum ether which was discarded test tubes, and the SEP-PA is eluted with 75% ethyl ether/petroleum. The eluent is cooled in a 15 ml test tube.

(k) The organic solvents are evaporated using a nitrogen stream using gentle heat from a hot water bath.

(l) The solid is resuspended with 2 ml of HPLC mobile phase hexane: isopropanol, 99.9/0.1:v/v.

(m) Each sample are then ready for (HPLC) analysis for cholesterol according to the method of Hurst, et al. Some results are shown in FIGS. 6 and 7.

Experimental Procedures

EXAMPLE 3

Removal of Cholesterol From Butteroil or Milk Fat (a) The crude saponin from the supplier (about 0.6 g) was extracted twice with about 100 ml of diethylether. The ether is removed from the extract by drying using a vacuum.

(b) The butteroil is mixed with the ether washed saponin as a 45 mg/ml aqueous commission so that a final concentration of 40 mg of saponin extract is present per gram of butteroil. An emulsion of butteroil and water contain the cholesterol: saponin complex is formed that has viscosity and appearance of mayonnaise at 20° C. or cold heavy whipped cream.

(c) The butteroil and aqueous solution of step (b) as an emulsion are shaken in a standard waterbath shaker at 200 rpm at 40° C. for 12 hr.

(d) To the emulsion of Step (c) was added about 100 mg of CELITE #535 (per gram of butteroil). The reaction mixture was maintained with shaking at about 200 rpm at about 40° C. for about 2 hr.

(e) The emulsion of step (d) was filtered through a CELITE 560 filter cake at about 52° C. The temperature is increased because of the higher viscosity of the butteroil at lower temperatures.

(f) The filtrate of step (e) is allowed to separate at 40° C. into two phases butteroil and water, and the butteroil reduced in cholesterol content is collected.

(g) A portion is removed to determine the level of cholesterol remaining in the butteroil using the high pressure liquid chromatography procedure of W. J. Hurst, et al. as described in the methods.

EXAMPLE 4

Removal of Cholesterol From Butter Prepilot Plant Experiments (a) Butter (300 g) from Dairymans Cooperative, 400 South M Street, Tulare, Calif. 93274, is added to a conventional style mixer. This mixer was constructed so that vortices in the mixing were avoided. In the experiments, shown in Table A below, water jacketed temperature-controlled PLEXIGLAS cylinder having an open chamber of about 17 cm in height and 6.8 cm interior diameter is used. Within the chamber is a removable baffle having 4 equally spaced (0°, 90°, 180°, 270°) parallel barriers located the height of the cylinder on the inner curved surface of the chamber parallel with the axis of the cylinder. The barriers vary in dimension depending upon the amount of agitation desired. These barriers protrude toward the center of the curved surface about 0.8 cm. This mixer configuration has the advantage that the progress of the mixing is observed. Solid saponin (12 g) as a fine powder is added over 2-5 min. The mixture is then mixed using a conventional impeller stirrer at 50 rpm for 60 min. at 40° C. An emulsion is formed. This emulsion (26 or 260 gm) is added to water (1740 to 1974 g) containing powdered CELITE 545 (6 or 60 g) available from Manville Corp. of Denver, Col. This mixture is then stirred rapidly at 435 rpm for 10 to 60 min. at 40 to 80° C. A three phase system of oil, water and solids is produced. The mixture is then transferred batchwise or continuously to a centrifuge clarifier/separator, prepilot scale centrifuge from Westfalia Separator A G, P.O. Box 3720, 4740 Oelde, W. Germany, or Centrico, Inc. 3400 Third Avenue, Foster City, Calif. 94404, type TA 05-00-105. The mixture is clarified by centrifugation at 8000 rpm, 40°-80° C. to remove the solids. The centrifuge equipment is then converted to a liquids separator by changing centrifuge bowls and the butteroil and water phase are separated at 13,700 rpm. at 65°-80° C.

More than 80% of the cholesterol is removed from the butteroil. The specific reaction conditions are shown in Table A.

TABLE A

| | CHOLESTEROL REMOVAL FROM BUTTEROIL | | | | | | |
|---|---|---|---|---|---|---|---|
| Exp. | Cholesterol mg/g/fat | % Removal from 3 mg/g | Temp. °C. | Celite g/batch | Water g/batch | Emulsion g/batch | Water pH |
| 1 | 2.70 | 10.00 | 80 | 60 | 1740 | 260 | 7 |
| 2 | 2.42 | 19.33 | 80 | 6 | 1740 | 260 | 9 |
| 3 | 0.60 | 80.00 | 40 | 6 | 1974 | 26 | 9 |
| 4 | 0.56 | 81.33 | 80 | 6 | 1740 | 260 | 7 |

EXAMPLE 4A

Removal of Cholesterol from Cream or Milk (a) The saponin crude extract is extracted with diethylether (two—100 ml extractions per about 0.6 g of crude extract). The ether is removed by drying.

(b) The milk or cream is mixed with the saponin extract (a dry powder is preferred) using about 40 mg of saponin per gram of fat in the milk or cream.

(c) The saponin-milk mixture is shaken (250 rpm) in a shaker waterbath at 65° C. for 2 hr.

(d) CELITE #545 (Manville Corp., Denver, Col.) is added to the shaker flask (100 mg of CELITE per gram of fat in the milk) and shaken at 250 rpm for 1 hr.

(e) The reaction mixture is filtered through a CELITE #560 filter cake (about # inch thick) at 65° C. using a water vacuum.

(f) The filtered milk is collected and determined according to the HPLC procedure of W. J. Hurst et al. which is incorporated herein by reference.

Usually the removal of cholesterol from dairy product using the process of the present invention is between about 60 and 100%. 3-$\beta$-Cholesterol esters present in the dairy product which do not complex with the saponin are not removed. Usually, the removal of cholesterol in one separation is about 90% or better, often to 95% or greater. If a lower amount of cholesterol in dairy product is desired, multiple treatment with saponin can be performed.

EXAMPLE 5

Removal of Cholesterol From Milk or Cream

Milk samples used had a cholesterol concentration from between 2.04 and 2.56 mg of cholesterol per gram of milk fat.

General Procedure for Milk Samples a. The milk sample (about 200 g having about 3.5% fat) at 65° C. was agitated with food grade solid powdered saponin (from Penco of Lyndhurst Corp.) (0.2 gram per gram of fat). The mixture agitated using 65° C. Next the sample filtered hot at 60°-65° C. through 1-2 g of CELITE 545 filter cake.

The milk samples (unpasteurized non homogenized raw whole) were analyzed for cholesterol. The results for specific samples are found in Table B.

TABLE B

| Sample | Control Concentration | Treated Concentration | Percent Cholesterol Removal |
|---|---|---|---|
| 1 | 2.56 mg | 0.43 mg/g | 83 |
| 2 | 2.56 | 0.53 | 79 |
| 3 | 2.43 | 0.82 | 66 |
| 4 | 2.52 | 0.52 | 79 |

General Procedure for Cream Samples (b) The cream sample (unpasteurized, nonhomogenized, raw cream, about 50 g) having about 40% fat was agitated with food grade solid powdered saponin (0.1 gram per gram of fat, from Penco of Lyndhurst Corporation of 540 New York Avenue, Lyndhurst, N.J. 07071).

The mixture was agitated using a conventional rotary shaker for 1 hour at 65° C. The hot product was filtered hot through a CELITE 545 filter cake (1-2 g). The results for specific samples are shown in Table C.

TABLE C

| Sample | Control Concentration | Treated Concentration | Percent Cholesterol Removal |
|---|---|---|---|
| 1 | 1.50 | 0.58 mg/g | 61 |
| 2 | 1.62 | 0.72 | 56 |
| 3 | 2.28 | 0.52 | 77 |

Cholesterol Analysis for Milk and Cream (d) CELITE filtered samples are collected into 50 ml screw cap test tubes.

The milk or cream sample is centrifuged at 10,000 g for 15 min. at 4° C. to collect a plastic cream layer which is about 90% fat.

Three grams of the plastic cream is placed in a conical test tube to which 1 ml H2O and 100 microliter TERGITOL 7 of Sigma Chemical, P.O. BOX 14508, St. Louis, Mo. 53178, was added.

This mixture was heated to 100° C. for 45 min and then centrifuged at 1700×g for 5 min to collect pure butteroil.

Hot

Of this butteroil 0.1 g was removed and analyzed for cholesterol as described above.

While only a few general embodiments of the invention have been shown and described herein, it will become apparent to those skilled in the art that various modifications and changes can be made in the removal of cholesterol from dairy and other cholesterol containing products using saponins without departing from the spirit and scope of the present invention. All such modifications and changes coming within the scope of the appended claims are intended to be carried out thereby.

We claim:

1. A process for the removal of cholesterol from a processed or unprocessed daily product, which process comprises:
   (a) obtaining a processed or unprocessed food-grade liquid daily product containing cholesterol, with the proviso that if water is not present in the footgrade daily product, adding water in between 1 and 80 fold by weigh of the daily product to the daily product to produce a liquid oil phase and a liquid aqueous phase;
   (b) containing with agitation the food-grade daily liquid product of step (a) at a temperature of between 35° and 80° C. as a liquid with a non-toxic food grade saponin present as an aqueous solution in an amount effective to bind up to about 80% or more of the cholesterol present in the liquid dairy product and to produce an insoluble cholesterol:-saponin complex in the liquid oil/aqueous phases;
   (c) contacting with agitation the cholesterol:saponin complex formed in the liquid oil and liquid aqueous phases of step (b) at a temperature of between about 35° and 80° C. with an effective amount of powdered solid adsorbent selected from the group consisting of diatomateous earth, silica, alumina, aluminum oxide, and bentonite to produce an insoluble cholesterol: saponin:adsorbent complex in the liquid daily product and water;
   (d) separating the insoluble cholesterol: saponin:adsorbent complex formed in step (c) from the liquid daily product and water; and
   (e) separating the liquid dairy product and water of step (d) recovering the liquid food grade dairy product having a reduced content of cholesterol.

2. The process of claim 1 wherein the dairy product is selected from the group consisting of raw milk, pasteurized milk, raw cream, pasteurized cream, buttermilk, butteroil and anhydrous milk fat.

3. The process of claim 2 wherein the dairy product is butteroil and the process of steps (b) to (e) is performed at between about 35° and 50° C.

4. The process of claim 3 wherein:
in step (b) the food-grade saponin is present in about 20 fold excess of the cholesterol present and the time of contact is between about 1 and 16 hours;
in step (c) the temperature is between about 35° and 50° C. and the adsorbent is selected from the group consisting of diatomateous earth, silica, alumina, aluminum oxide and bentonite; and
in step (d) the insoluble cholesterol/saponin/adsorbent complex is removed from the dairy product and water present by centrifugation.

5. The process of claim 4 wherein:
in step (b) the food-grade saponin is first pretreated with an organic solvent to remove some organic soluble materials and the solvent is separated, and the saponin is obtained from Quillaja or Yucca plants and is of food-grade quality, and
in step (c) the adsorbent is diatomateous earth.

6. The process of claim 5 wherein the food product is butteroil in step (b) water is added in between about 1 to 80 fold by weight excess of the butteroil, and butteroil/water/solid product is separated of solids using a centrifuge, and the centrifuge is then adapted to separate the butteroil and water.

7. The process of claim 1 which further includes:
step (f) separating the insoluble cholesterol: saponin/diatomateous earth onto its three components.

8. The process of claim 2 wherein the dairy product is selected from the group consisting of raw milk pasteurized mil, raw cream and pasteurized cream.

9. The process of claim 8 wherein the steps (b) and (c) the temperature is at about 40° C. and the a adsorbent is diatomateous earth, and
in step (d) the insoluble cholesterol:saponin:adsorbent complex is separated from the dairy product and water present using vacuum filtration through diatomateous earth at between about 55° and 60° C.

10. The process of claim 1 wherein the removal of cholesterol from butteroil is performed at about 40° C., and removal of cholesterol from milk or cream is performed at about 65° C.

11. A process for the removal of cholesterol from a cholesterol containing food product, which process comprises:
(a) obtaining a liquid food-grade food product comprising cholesterol, with the proviso that if water is not present in the food-grade food product, adding water in between 1 and 80 fold by weight of the product to the liquid food product to produce a liquid oil phase and a liquid aqueous phase;
(b) contacting the liquid food-grade food product and oil/water mixture at a temperature of between about 35° and 80° C. with agitation with an amount of powdered food-grade saponin effective to bind the cholesterol present in the liquid food product and water to produce a cholesterol-saponin complex in the food product and water emulsion;
(c) contacting with agitation at a temperature of between about 35° and 80° C. the liquid food product and water containing the cholesterol:saponin formed in step (b) with an effective amount of solid adsorbent selected from the group consisting of diatomaceous earth, alumina, silica, aluminum oxide and bentonite;
(d) separating cholesterol:saponin:adsorbent complex of step (c) by sedimentation, filtration, or centrifugation from the liquid at between 35° and 80° C.; and
(e) separating and recovering the liquid food-grade food product having about 80% or more of the cholesterol removed.

12. The process of claim 11 wherein the product is selected from the group consisting of dairy products, or liquid egg.

13. The process of claim 12 wherein the process of steps (b) to (e) is performed at between about 35° to 50° C.

14. The process of claim 13 wherein:
in step (b) the saponin is present in about 20 fold excess of the cholesterol present and the time of contact is between about 1 and 16 hours;
in step (c) the temperature is between about 35° and 50° C. and the adsorbent is selected from the group consisting of diatomateous earth, silica, alumina, aluminum oxide and bentonite; and
in step (d) the insoluble cholesterol/saponin/adsorbent complex is removed from the liquid by centrifugation.

15. The process of claim 14 wherein:
in step (b) the food-grade saponin is prewashed with an organic solvent to remove some organic soluble materials and the saponin is obtained from Quillaja or Yucca plants and is of food-grade quality, and
in step (c) the adsorbent is diatomateous earth.

16. The process of claim 15 wherein the saponin is obtained from Yucca.

17. The process of claim 11 which further includes:
step (f) separating the insoluble cholesterol: saponin/diatomateous earth into its three components.

18. The process of claim 12 wherein the food product is egg.

19. The process of claim 18 wherein the mixing
in steps (b) and (c) is at about 40° C. and the adsorbent is diatomateous earth, and
in step (d) the insoluble complex are separated from the liquid using vacuum filtration through diatomateous earth at between about 55° and 60° C.

* * * * *